(12) United States Patent
Lackman et al.

(10) Patent No.: US 6,188,670 B1
(45) Date of Patent: Feb. 13, 2001

(54) METHOD AND SYSTEM IN A DATA PROCESSING SYSTEM FOR DYNAMICALLY CONTROLLING TRANSMISSION OF DATA OVER A NETWORK FOR END-TO-END DEVICE FLOW CONTROL

(75) Inventors: Robert Andrew Lackman, Wake Forest; Thomas B. Genduso, Apex, both of NC (US)

(73) Assignee: International Business Machines Corporation, Armonk, NY (US)

(*) Notice: Under 35 U.S.C. 154(b), the term of this patent shall be extended for 0 days.

(21) Appl. No.: 08/961,759

(22) Filed: Oct. 31, 1997

(51) Int. Cl.$^7$ .......................... G01R 31/08; G06F 11/00; G08C 15/00
(52) U.S. Cl. .................. 370/231; 370/235; 710/29
(58) Field of Search .................. 370/229, 230, 370/231, 235, 236, 411, 412, 413, 414, 418, 428, 429; 710/18, 29, 40

(56) References Cited

U.S. PATENT DOCUMENTS

| | | | |
|---|---|---|---|
| 5,282,203 | * | 1/1994 | Oouchi .......................... 370/94.1 |
| 5,539,729 | * | 7/1996 | Bodnar .......................... 370/18 |
| 5,732,094 | * | 3/1998 | Petersen et al. .................. 371/51.1 |
| 5,742,606 | * | 4/1998 | Iliadis et al. .................... 370/413 |
| 5,793,748 | * | 8/1998 | Murase .......................... 370/235 |
| 5,796,719 | * | 8/1998 | Peris et al. ..................... 370/231 |

* cited by examiner

Primary Examiner—Ajit Patel
Assistant Examiner—Duc Ho
(74) Attorney, Agent, or Firm—Felsman, Bradley, Vaden, Gunter & Dillon, LLP

(57) ABSTRACT

A method and system provide end-to-end flow control between a sender and a receiver attached to a network. The data is divided into a plurality of packets. A priority hierarchy of a plurality of priority levels is established. Each packet of data is associated with one of the priority levels. Transmission of the plurality of packets is initiated from a transmitter to a receiver transmitting the plurality of packets in the priority hierarchy. The real-time data is divided into a plurality of frames. Each of the plurality of frame is divided into multiple packets. Each of the plurality of frames is stored in a frame buffer included within the receiver. During transmission, a level of a plurality of frames included within the frame buffer is monitored. In response to the level crossing a first buffer threshold, a determination is made as to whether a first plurality of the multiple packets are associated with a first priority level. In response, the priority level associated with the first plurality of the multiple packets is then modified to be a second priority level. Transmission is then continued where the first plurality of the multiple packets are transmitted utilizing only the second priority level.

16 Claims, 6 Drawing Sheets

Figure 1:
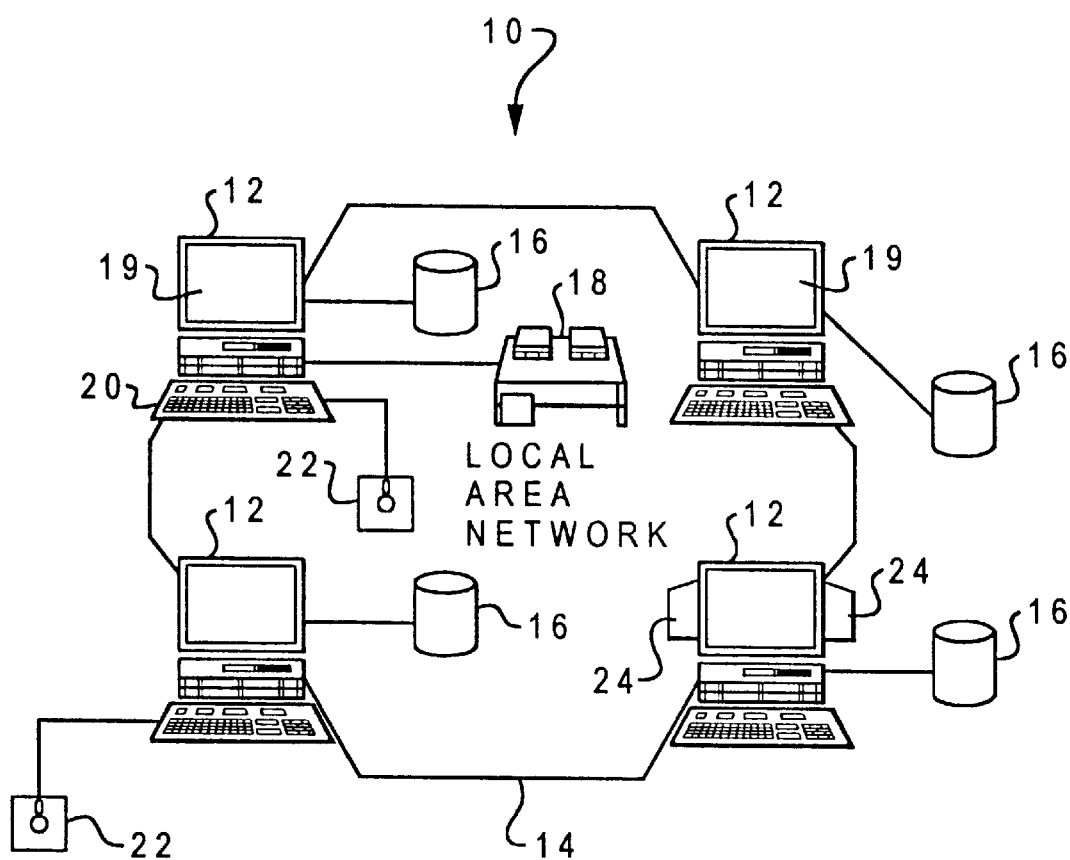

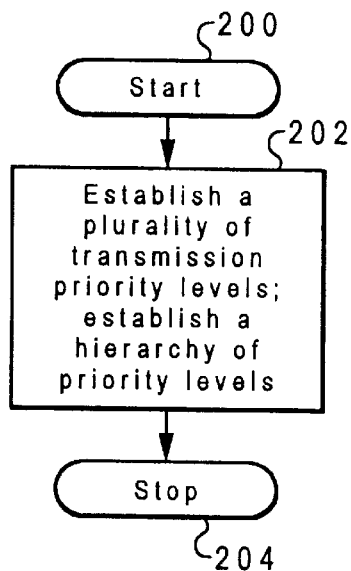
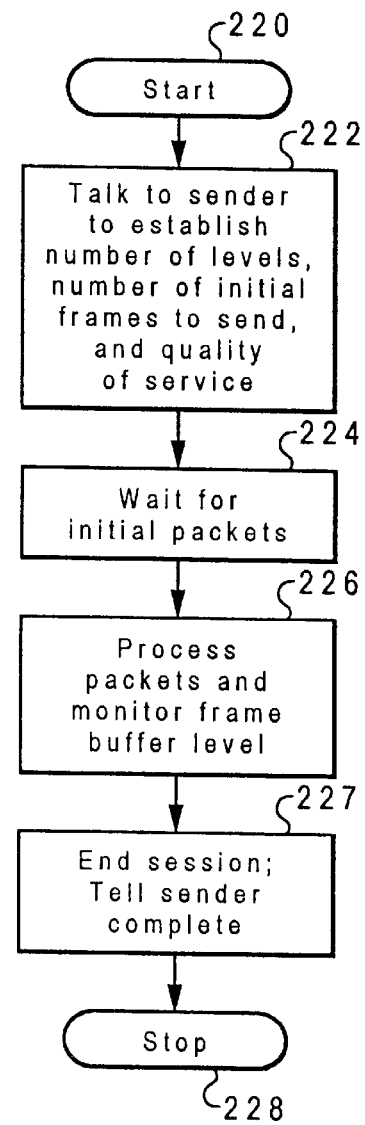
Fig. 5
Fig. 6

METHOD AND SYSTEM IN A DATA PROCESSING SYSTEM FOR DYNAMICALLY CONTROLLING TRANSMISSION OF DATA OVER A NETWORK FOR END-TO-END DEVICE FLOW CONTROL

BACKGROUND OF THE INVENTION

1. Technical Field

The present invention relates to data processing systems and, in particular, to dynamically controlling transmission of data over a network within a data processing system. Still more particularly, the present invention relates to a method and system in a data processing system for permitting a receiver to dynamically alter a transmission priority level associated with multiple real-time data packets during transmission of real-time and non-real-time packets over a network in order to provide end-to-end flow control between a sender and a receiver attached to the network.

2. Description of the Related Art

Multimedia computer systems are commonly utilized within data processing systems and are capable of presenting material utilizing a combination of text, graphics, video, animation, and sound. Proper scheduling of the system's resources is important in order to maintain an efficient, high-quality multimedia presentation.

One such resource is the data transmission capacity of a network, which is shared among the devices connected to the network. A network is a data communication system that is used to interconnect two or more computers. A multimedia application may access data during operation which requires utilization of the network. It is recognized that certain data in a system, such as that associated with a multimedia presentation, may require timely handling during transmission. Therefore, a "quality of service" has been defined in the literature, which seeks to describe various parameters which may be specified to define certain minimum requirements which must be met for transmission of given data types over the network. These quality of service parameters may, then, be utilized by a resource manager in order to properly allocate system resources.

Real-time data is data that must arrive by a specified time or deadline. Failure of the real-time data to arrive by the deadline will cause an error at the destination. One example of real-time data is video data which is to be displayed on a display screen. It is important that the frames which are included within the video data be received every 1/30th of a second. Another example is packetized audio. If the audio data is delayed, a pop will be heard at the receiver. The quality of service of real-time may be measured by the percentage of frames that meet their deadlines.

Non-real-time data is data which has no deadline. One example of non-real-time data is a file transfer. The quality of service of non-real-time may be measured by the average time to deliver a file.

If a system is to include support for multimedia applications across the network, then the network must support the transmission of both real-time and non-real-time data simultaneously. The transmission of both real-time and non-real-time data simultaneously on the network includes a number of design trade-offs which, if not managed properly, can have undesirable consequences on the overall performance of the system.

Multiple data streams might be flowing through the network simultaneously. Because the network is composed of a finite set of resources, a scheme must be established to determine which data stream will be granted control of a particular resource when two or more data streams simultaneously require the same resource.

A data stream is divided into smaller units called data packets. A data packet is a unit of data transmission which is transmitted through the network. A data packet includes the specified number of bytes of data that is to be transmitted, along with data that is used by the network to control the flow through the network. Each data stream has an associated quality of service. Quality of service is the performance that a data stream receives as it travels through the network. Quality of service is measured by such parameters as throughput, delay, and jitter (the degree of variation within the inter-arrival times of the data packets).

There may be two types of data streams flowing through the network, real-time and non-real-time. A real-time data stream assumes that data packets will be delivered at a specified time and/or at a specified rate. An example of real-time data is full motion video. A video stream is composed of frames, each frame being a single still image. The still images are presented to a viewer at the rate of a new image every 1/30th of a second. Frames stored in a first computer in the network may be viewed as full motion on a second computer in the network. It is not possible to send all of the images from the first computer to the second computer simultaneously. Therefore, a scheme must be utilized to send the frames as a data stream through the network whereby the viewer can view them in the correct order and see a new frame every 1/30th of a second.

Frames are typically transmitted across a network as a group of data packets. When the data packets arrive at the receiving computer, they are reassembled into frames and placed into a frame buffer until they are needed by the viewer. A frame buffer is a finite set of storage locations where received frames can be held until the time they are needed. A frame buffer can be implemented as part of the RAM, or as a set of storage locations in the main memory of the receiving computer.

An example of one attempt to support simultaneous transmission of both real-time and non-real-time data is to designate all real-time data transmission on the network as a higher priority above all non-real-time data transmissions. When this approach is taken, real-time data streams are transmitted through the network in a more timely manner because they are allocated the network resources ahead of any non-real-time data streams which may also require the same resource. However, this approach may greatly degrade the performance of non-real-time data which still desires a low latency and maximum throughput even though there is no deadline. Further, all real-time data are treated as equally urgent using this approach even though some may be far away from their deadline and others may be very close to it. In addition, a real-time data stream can not dynamically adjust its quality of service. If it is experiencing a poor quality of service, there is no way to request better service. If quality of service is proportional to communication costs, there is no way of reducing the communication costs associated with real-time data transmissions.

Another approach is for the network switches or routers to schedule real-time transmission over the network in order of the deadline of the data stream. This approach requires that the real-time data include deadline information. Many defined protocols, such as Asynchronous Transfer Mode (ATM), do not provide for deadline information to be included with the data in such a manner. When network communication speeds become higher but the hardware speeds do not increase proportionally, the processing that can be done at the network switches and routers becomes more limited. This approach places an excessive processing requirement on the network switches. Non-real-time data transmissions also may suffer an excessive delay.

Therefore a need exists for a method and system in a data processing system to dynamically control transmission of non-real-time and real-time data over a network, where the data does not include deadline information.

SUMMARY OF THE INVENTION

It is therefore one object of the present invention to provide an improved data processing system.

It is another object of the present invention to provide a method and system for dynamically controlling transmission of data over a network in a data processing system, where the data includes both real-time and non-real-time data.

It is yet another object of the present invention to provide a method and system in a data processing system for permitting a receiver to dynamically alter a transmission priority level associated with multiple real-time data packets during transmission of real-time and non-real-time packets over a network.

The foregoing objects are achieved as is now described. A method and system in a data processing system are disclosed for dynamically controlling transmission of data over a network. The method and system provide end-to-end flow control between a sender and a receiver attached to a network without the network being explicitly involved in the flow control. The data includes both real-time and non-real-time data. The data is divided into a plurality of packets. A priority hierarchy of a plurality of priority levels is established. Transmission of the plurality of packets is initiated from a transmitter to a receiver transmitting the plurality of packets at a specified priority level. The real-time data is divided into a plurality of frames. Each of the plurality of frames is divided into multiple packets. Transmission is initiated. Each of the plurality of frames that is received by the receiver is stored in a frame buffer. During transmission, a level of a plurality of frames included within the frame buffer is monitored. In response to the level crossing a first buffer threshold, a determination is made as to whether the next plurality of multiple packets are to be associated with a different priority level. In response to the first plurality of the multiple packets being associated with a first priority level, the priority level associated with the next plurality of the multiple packets may then be modified to be a second priority level. Transmission is then continued where the plurality of the multiple packets are transmitted utilizing the second priority level until such time as there is a level crossing within the frame buffer.

The above as well as additional objectives, features, and advantages of the present invention will become apparent in the following detailed written description.

DETAILED DESCRIPTION OF A PREFERRED EMBODIMENT

A preferred embodiment of the present invention and its advantages are better understood by referring to FIGS. 1–8 of the drawings, like numerals being used for like and corresponding parts of the accompanying drawings.

With reference now to the figures and in particular with reference to FIG. 1, there is depicted a pictorial representation of a data processing system 10 which may be utilized to implement the method and system of the present invention. In a preferred embodiment, data processing system 10 may include a plurality of computers 12 which may be connected together in a local area network 14. Of course, those skilled in the art will appreciate that a plurality of intelligent workstations coupled to a host processor may be utilized to implement such network.

As is common in such data processing systems, each individual computer may be coupled to a storage device 16 and/or a printer/output device 18. One or more such storage devices may be utilized to store the various data objects or multimedia files which may be periodically accessed, processed, and presented within data processing system 10 in accordance with the method and system of the present invention. In a manner well known in the prior art, each such data processing document or multimedia file may be stored within a storage device which may be associated with a resource manager or library service, which is responsible for maintaining and updating all resource objects associated therewith.

Each computer 12 may be implemented utilizing any suitably configured personal computer, mini computer, mainframe computer, or a computer running in a network of other computers. Computer 12 has associated therewith a computer display 19, keyboard 20, input pointing device 22, and speakers 24. Those skilled in the art will appreciate that input pointing device 22 may be implemented utilizing a pointing stick, a mouse, a track ball, or a pen.

Figure 2:
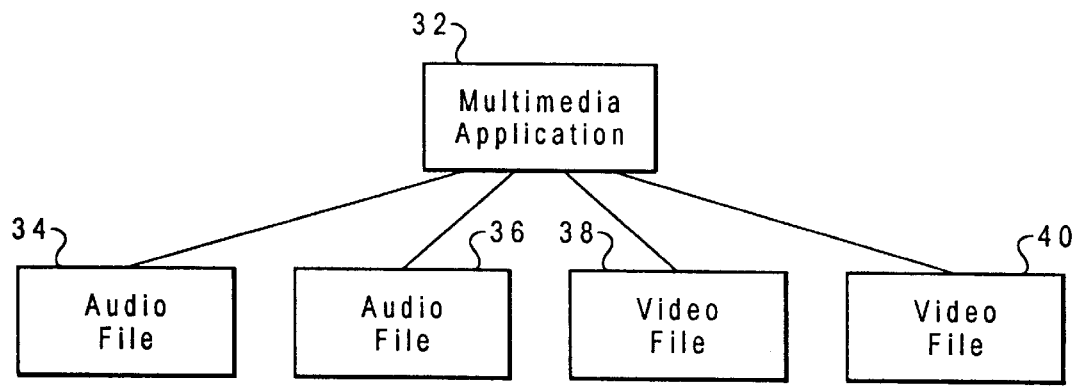

Referring now to FIG. 2, there is depicted a pictorial representation of a multimedia application 32 and the multimedia files that multimedia application 32 accesses and presents in accordance with the method and system of the present invention. A multimedia application is a software program which executes on a computer. As part of the operation of the multimedia application, the application will access files which contain data which is to be presented to an external device, such as speakers or a screen, in a time dependent manner. Data processing system 10 may be utilized to present multimedia application 32 which may include a variety of text, graphics, video, animation, and sound. The text, graphics, video, animation, and sound portions of multimedia application 32 may be stored separately in multimedia files which are then accessed at the appropriate time during the presentation of multimedia application 32. Typically, a user of a first computer may wish to access and view files stored in a second computer. In this manner, the files continue to be stored within the second computer, but displayed on a display screen of the first computer, where the file contains video data for example.

When these files are presented, they will need to be transmitted utilizing a network from a sender to a receiver. For example, a video file which is stored in a storage device on one computer may need to be displayed on the display screen of another computer in the network. In this case, the file must be transmitted from the storage device to be displayed on the screen. The file is transmitted utilizing the network. Also during this time, non-real-time data may need to be transmitted utilizing the same network. For example, file transfers may need to be performed. Both real-time data and non-real-time data may need to be transmitted simultaneously utilizing the same network. The present invention provides a method and system for permitting a receiver to dynamically alter a transmission priority level associated with multiple real-time data packets during transmission of real-time and non-real-time packets over a network.

Figure 3:
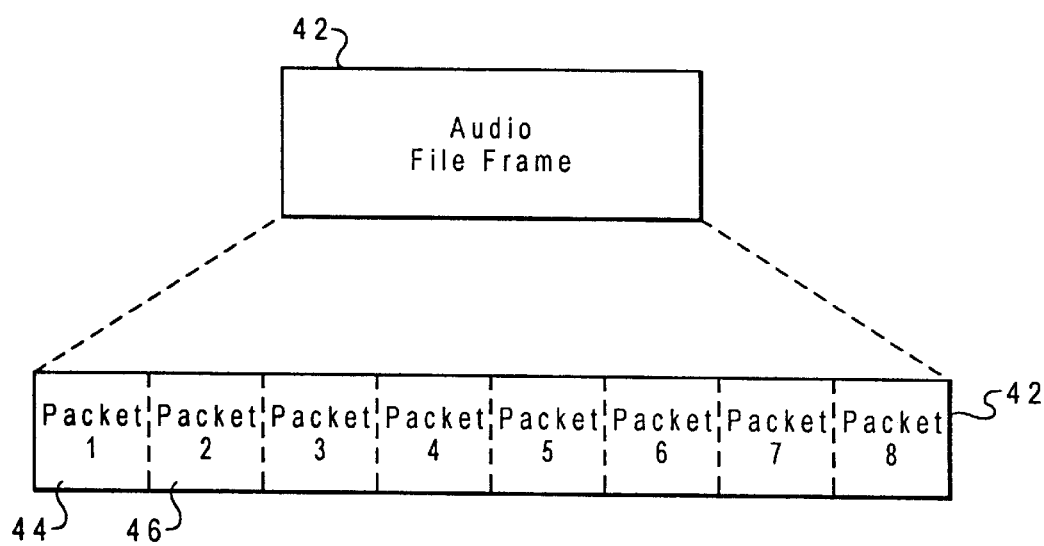

FIG. 3 illustrates a pictorial representation of a plurality of packets included within a frame which is associated with a multimedia file in accordance with the method and system of the present invention. Each file includes real-time data. Real-time data may comprise a plurality of frames. Each frame is divided into multiple packets for transmission. The packets do not include information regarding the deadline associated with the real-time data. Audio file 34 may include a plurality of frames, such as frame 42. The frames are further divided into smaller units called packets. For example, frame 42 includes a plurality of packets, such as packets 44 and 46. Packets of data are transmitted across the network. Packets must be received by the receiver in the order in which they are transmitted.

Figure 4:
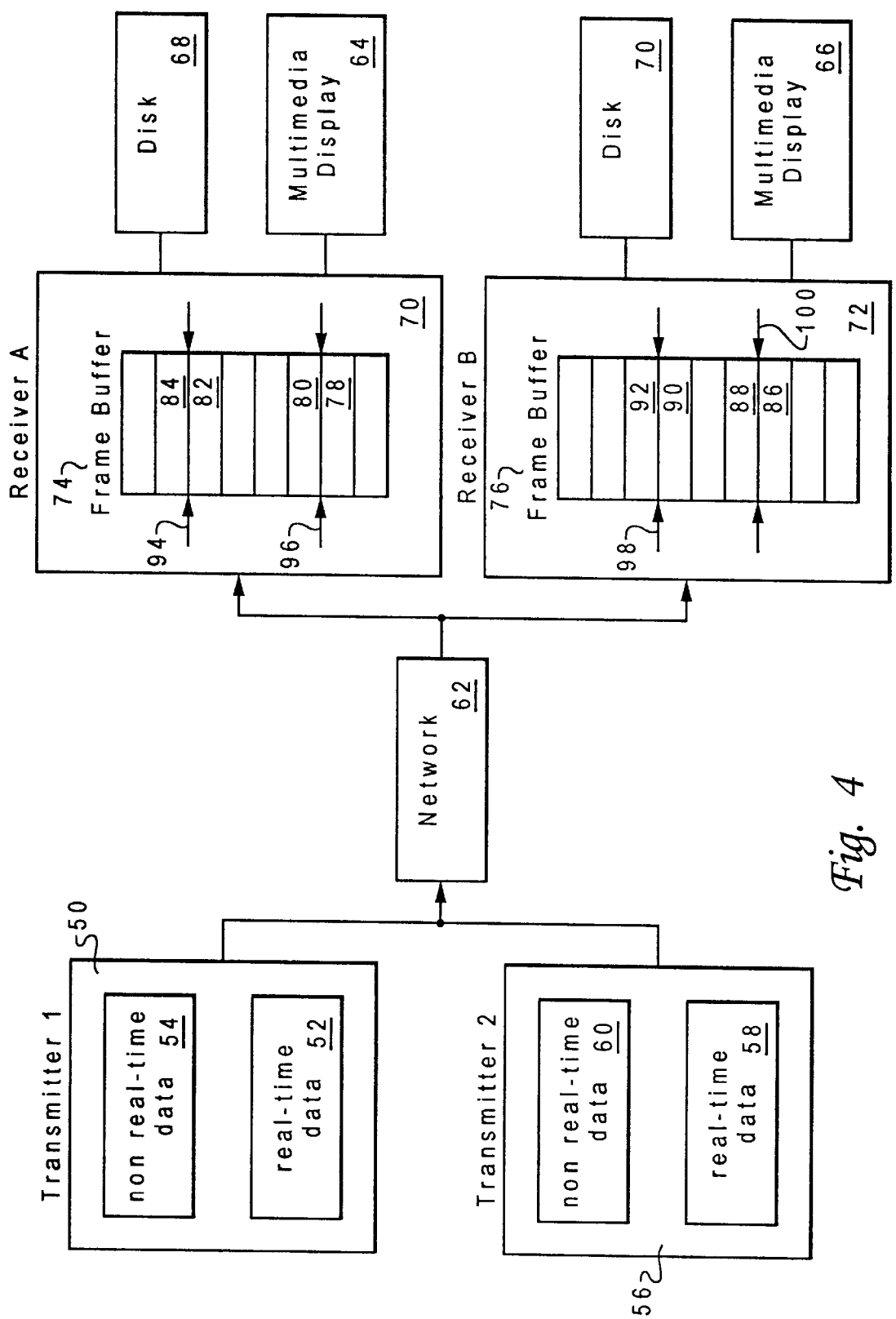

FIG. 4 depicts a pictorial representation of a plurality of transmitters and a plurality of receivers for transmitting and receiving data utilizing a network within said data processing system 10 in accordance with the method and system of the present invention. Transmitter 50 is capable of transmitting both real-time data 52 and non-real-time data 54. Transmitter 56 is capable of transmitting both real-time data 58 and non-real-time data 60. Data is transmitted from a transmitter to a receiver utilizing network 62.

Once received, real-time data may be presented, such as by displaying video data on displays 64 and/or 66. Non-real-time data may be stored, such as in disk 68 and/or 70.

Receiver 70 receives both real-time data and non-real-time data. Receiver 72 receives both real-time data and non-real-time data. Non-real-time data, such as file transfers, are received and stored into storage devices such as a disk. Real-time data is transmitted as packets. When a receiver receives the real-time packets, they are assembled into frames which are then placed into a frame buffer. The frame buffer stores frames which have been received which are to be presented on a device such as a display. Receiver 70 includes a frame buffer 74; and receiver 72 includes a frame buffer 76.

A frame buffer includes a plurality of storage locations. A storage location is utilized to store a single frame. Frame buffer 74 includes a plurality of storage locations, such as locations 78, 80, 82, and 84. Frame buffer 76 includes a plurality of storage locations, such as locations 86, 88, 90, and 92. When real-time data which includes a plurality of frames is received by a receiver, the frame buffer included within the receiver begins to fill. Each received frame is placed into the frame buffer sequentially in some predetermined order.

In accordance with the method and system of the present invention, a priority hierarchy of priority levels is established. In an initial priority hierarchy, a control priority is the highest priority, followed by a high real-time priority, a low real-time priority, and finally a non-real-time priority. Each packet to be transmitted is associated with one of these priority levels. The packets do not include deadline information.

The data processing system may need to alter this priority hierarchy in cases of heavy traffic across the network in order to benefit one type of data at the expense of another. The data processing system may utilize quality of service parameters to determine, for example, that it is more important to transmit non-real-time data than data associated with a low real-time data priority. In this case, the priority hierarchy may be altered to the following: Control priority, high real-time priority, non-real-time priority, and then low real-time priority.

Each receiver in the data processing system may control the priority level associated with real-time data which is being transmitted to that receiver. In this manner, each receiver may customize the priority level associated with real-time data being transmitted so that the receiver may maintain an appropriate level of data in its frame buffer. Changing the priority level may slow down or speed up the flow. It will also change the variability of the inter-arrival times of the data. In this way, quality of service for the data is changed.

In order for a receiver to determine whether or not to alter the priority level associated with real-time data being transmitted, a plurality of buffer thresholds are associated with the frame buffer included within the receiver. Those skilled in the art will recognize that any number of buffer threshold levels may be utilized. In a preferred embodiment, two buffer thresholds are utilized: a higher threshold and a lower threshold. When a transmitter is transmitting packets associated with a higher real-time priority and the receiver's frame buffer crosses a higher buffer threshold, such as threshold 94 or 98, the receiver will send a control packet to the transmitter to request that real-time packets now be associated with a lower real-time priority. The control packet the receiver transmits to the transmitter is sent associated with a control priority.

When the level of the receiver's buffer falls to a lower buffer threshold, such as threshold 96 or 100, the receiver will send a control packet to the transmitter to request that packets which include real-time data now be associated with the higher real-time priority level. The control packet the receiver transmits to the transmitter is sent associated with a control priority. Changing the priority level will change the quality of service received for that data stream. The change of quality of service may result in the data packets being sent at a faster rate and/or the variation in the inter-arrival times of the data packets being reduced.

In this manner, a receiver may dynamically control the priority level associated with real-time packets it is receiving in order to attempt to maintain an ideal level of frames stored in its frame buffer. The ideal level of frames can preferably be in the middle of the multiple thresholds.

The method and system of the present invention are utilized to permit end-to-end flow control. The receiver controls the flow based on the level of frame buffers usage in the receiver. The network does not explicitly perform the flow control.

FIG. 5 illustrates a high-level flow chart which depicts the establishment of a transmission priority hierarchy in accordance with the method and system of the present invention. The process starts as depicted at block 200 and thereafter passes to block 202 which illustrates the establishment of transmission priority levels, and the establishment of a hierarchy of priority levels. Multiple transmission priority levels may be defined. In a preferred embodiment, four transmission priority levels are defined. The highest priority level is a control priority (CP) and is associated with any control information. Control information may include a request to modify the transmission priority associated with data which is currently being transmitted.

Real-time data may be associated with one of a large number of different priorities. These priorities may be grouped and associated with one of a multiple of transmission priority levels. For example, there may be twenty-five different real-time priorities. At the time of transmission, a packet of real-time data may be associated with one of these twenty-five different priorities. For purposes of illustration only, the first ten priorities may be grouped and then associated with a higher transmission priority level. The remaining fifteen priorities may be grouped and associated with a lower transmission priority level. Those skilled in the art will recognize that the priorities may be grouped into any number of groups. For example, there may be three groups, each associated with one of three different transmission priority levels.

In a preferred embodiment, there are two real-time transmission priority levels. When a packet of real-time data is transmitted, it will be associated with one of these two priority levels. Either a high real-time priority level (HRTP) or a low real-time priority level (LRTP) is associated with the real-time data packet. All non-real-time data is associated with a non-real-time priority level (NRTP). The process then terminates as depicted at block 204.

FIG. 6 depicts a high-level flow chart which illustrates the operation of a receiver during a session of real-time data transmission in accordance with the method and system of the present invention. The process starts as depicted at block 220 and then passes to block 222 which illustrates the receiver talking to the sender, or transmitter, to establish a number of priority levels, number of initial frames, and quality of service parameters. Next, block 224 depicts the receiver waiting for the initial packets. Thereafter, block 226 illustrates the receiver processing the received packets and the monitoring of the level of frames in the receiver's frame buffer. This process includes the assembling of packets into frames and the placing of the frames into the frame buffer. When the receiver has received the final packet of real-time data, the process then passes to block 227 which depicts the receiver ending the session and telling the sender that the session is complete. The process then terminates as depicted at block 228.

Figure 7:
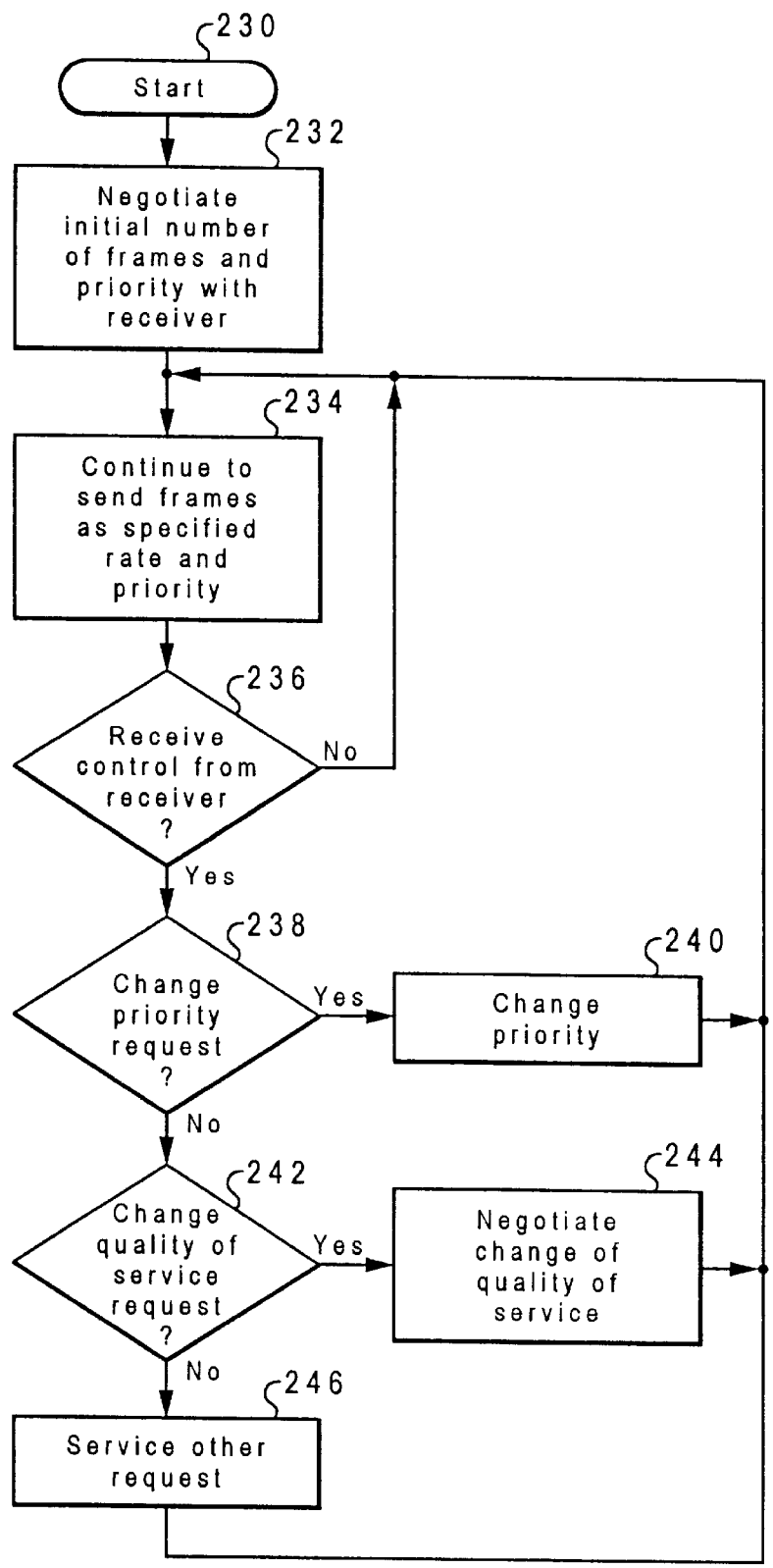

FIG. 7 illustrates a high-level flow chart which depicts the operation of a transmitter during a session of data transmission in accordance with the method and system of the present invention. The process starts at block 230 and thereafter passes to block 232 which depicts the negotiation with the receiver of an initial number of frames and priority to be associated with the transmission of these frames. Next, block 234 illustrates the transmitter continuing to send frames at a specified frame rate and with the negotiated priority level. Thereafter, block 236 depicts a determination of whether or not the transmitter has received a control packet from the receiver. If a determination is made that the transmitter has not received control from the receiver, the process passes back to block 234. Referring again to block 236, if a determination is made that the transmitter has received a control request from the receiver, the process passes to block 238 which depicts a determination of whether or not the transmitter has received a request to change the priority level associated with real-time packets.

If a determination is made that the transmitter has received a request to change the priority level associated with real-time packets, the process passes to block 240 which illustrates the changing of the priority level. If the transmitter had been transmitting real-time packets associated with a HRTP priority level, real-time packets will now be associated with a LRTP priority level. If the transmitter had been transmitting real-time packets associated with a LRTP priority level, real-time packets will now be associated with a HRTP priority level. The process then passes back to block 234.

Referring again to block 238, if a determination is made that the transmitter has not received a request to change the priority level associated with real-time packets, the process passes to block 242 which illustrates a determination of whether or not the transmitter has received a command request to change the quality of service. If a determination is made that the transmitter has received a request to change the quality of service, the process passes to block 244 which depicts the negotiation of a new quality of service. The process then passes back to block 234. Referring again to block 242, if a determination is made that the transmitter has not received a request to change the quality of service, the process passes to block 246 which depicts the servicing of other requests. The process then passes back to block 234.

Figure 8:
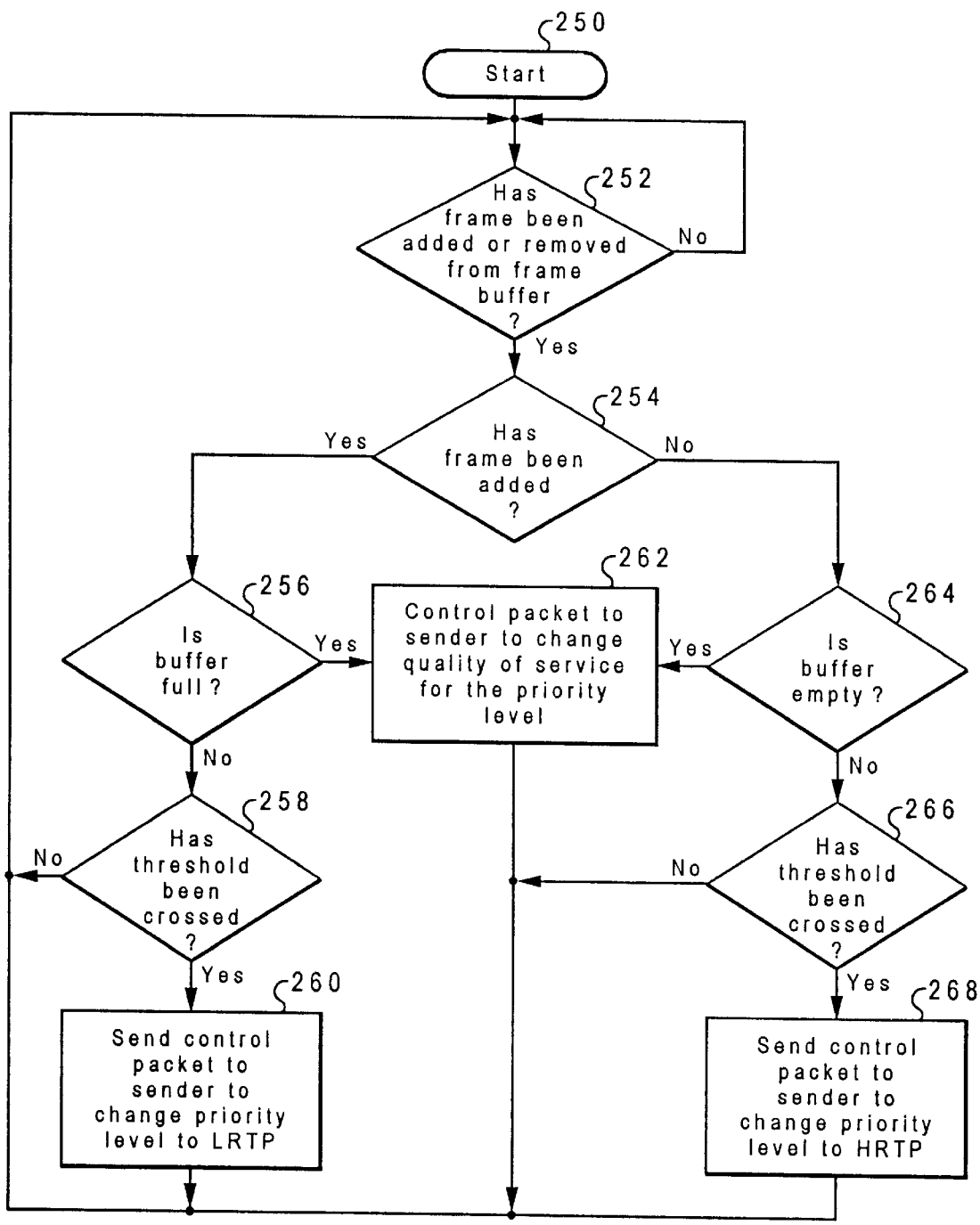

FIG. 8 depicts a high-level flow chart which illustrates the operation of a buffer manager included within a receiver during a session of data transmission in accordance with the method and system of the present invention. The process starts as depicted at block 250 and then passes to block 252 which illustrates a determination of whether or not a frame has been added to or removed from the frame buffer included within the receiver. If a determination is made that a frame has not been added to or removed from the frame buffer included within the receiver, the process passes back to block 252. Referring again to block 252, if a determination is made that a frame has either been added to or removed from the frame buffer included within the receiver, the process passes to block 254.

Block 254 depicts a determination of whether or not a frame has been added to the frame buffer. If a determination is made that a frame has been added to the frame buffer, the process to block 256 which illustrates a determination of whether or not the frame buffer is full. If a determination is made that the frame buffer is not full, the process passes to block 258 which depicts a determination of whether or not a first threshold, such as threshold 94, has been crossed. If a determination is made that the threshold has not been crossed, the process passes to block 252. If a determination is made that the threshold has been crossed, the process passes to block 260 which illustrates the receiver sending a control packet to the sender to change the priority level associated with real-time packets to LRTP. Thereafter, the process passes back to block 252.

Referring again to block 256, if a determination is made that the frame buffer is full, the process passes to block 262 which depicts the receiver sending a control packet to the sender to change the quality of service for the priority level. The process passes back to block 252.

Referring again to block 254, if a determination is made that a frame has not been added to the frame buffer, the process passes to block 264 which illustrates a determination of whether or not the buffer is empty. If a determination is made that the buffer is empty, the process passes to block 262. If a determination is made that the buffer is not empty, the process passes to block 266 which illustrates a determination of whether or not a second threshold, such as threshold 96 has been crossed. If a determination is made that the second threshold has not been crossed, the process passes back to block 252. If a determination is made that the second threshold has been crossed, the process passes to block 268 which depicts the receiver sending a control packet to the sender to change the priority level associated with real-time packets to HRTP. Thereafter, the process passes back to block 252.

While an illustrative embodiment has been particularly shown and described, it will be understood by those skilled in the art that various changes in form and detail may be made therein without departing from the spirit and scope of the illustrative embodiment.

What is claimed is:

1. A method in a data processing system for dynamically controlling end-to-end data flow over a network, wherein said data includes a plurality of packets to be transmitted, and wherein said data includes real-time and non-real-time data, said real-time data including a plurality of frames, each of said plurality of frames including multiple packets, said method comprising the steps of:

associating each of said plurality of packets with only one of a plurality of priority levels, said plurality of priority levels being established in a priority hierarchy;

initiating transmission of said plurality of packets from a transmitter to a receiver in said priority hierarchy;

storing said plurality of frames in a frame buffer included within said receiver;

during said transmission, monitoring a level of said plurality of frames stored within said frame buffer;

in response to said level of said plurality of frames crossing a first buffer threshold, determining if a first plurality of said multiple packets are associated with a first priority level;

in response to said first plurality of said multiple packets being associated with a first priority level, modifying said first priority level associated with each of said first plurality of said multiple packets, wherein each of said plurality of packets are associated with only a second priority level; and continuing transmission of said plurality of packets, wherein each of said first plurality of said multiple packets are transmitted utilizing said second priority level.

2. The method according to claim 1 further comprising the steps of:

in response to said level of said plurality of frames crossing a second buffer threshold, determining if said first plurality of said multiple packets are associated with a second priority level;

in response to said first plurality of said multiple packets being associated with a second priority level, modifying said first priority level associated with each of said first plurality of said multiple packets, wherein each of said plurality of packets are associated with only a first priority level; and continuing transmission of said plurality of packets, wherein each of said first plurality of said multiple packets are transmitted utilizing said first priority level.

3. The method according to claim 2 further comprising the steps of:

utilizing quality of service parameters to determine if said priority hierarchy should be altered; and in response to a determination that said priority hierarchy should be altered, said receiver dynamically altering said priority hierarchy of said plurality of priority levels during said transmission, wherein said plurality of packets are transmitted in said altered priority hierarchy.

4. The method according to claim 1 wherein said establishing a priority hierarchy includes establishing an hierarchy including a control priority level, a high real-time priority level, a low real-time priority level, and then a non-real-time priority level.

5. The method according to claim 4 further comprising the steps of:

associating each of said plurality of packets including non-real-time data with a non-real-time priority level;

associated each of said plurality of packets including control data with a control priority level; and associating each of said plurality of packets including real-time data with one of a real-time priority levels, said real-time priority levels including a high real-time priority level and a low real-time priority level.

6. The method according to claim 5 wherein said step of monitoring further comprising the step of determining if a level of said plurality of frames has changed.

7. The method according to claim 6 wherein said steps of in response to said level of said plurality of frames crossing a first buffer threshold, determining if a first plurality of said multiple packets are associated with a first priority level, and in response to said first plurality of said multiple packets being associated with a first priority level, modifying said first priority level associated with each of said first plurality of said multiple packets, wherein each of said plurality of packets are associated with only a second priority level, further comprises to steps of:

in response to a determination that said level has changed, determining if one of said plurality of frames has been added to said frame buffer;

in response to a determination that said one of said plurality of frames has been added to said frame buffer, determining if said frame buffer is full;

in response to a determination that said frame buffer is not full, determining if a first threshold has been crossed; and in response to said first threshold being crossed, modifying said first priority level associated with each of said first plurality of said multiple packets so that said each of said first plurality of said multiple packets is associated with a low real-time priority.

8. The method according to claim 7 wherein said steps of in response to said level of said plurality of frames crossing a second buffer threshold, determining if said first plurality of said multiple packets are associated with a second priority level, and in response to said first plurality of said multiple packets being associated with a second priority level, modifying said first priority level associated with each of said first plurality of said multiple packets, wherein each of said plurality of packets are associated with only a first priority level, further comprises the steps of:

in response to a determination that said one of said plurality of frames has not been added to said frame buffer, determining if said frame buffer is empty;

in response to a determination that said frame buffer is not empty, determining if a second threshold has been crossed; and in response to said second threshold being crossed, modifying said first priority level associated with each of said first plurality of said multiple packets so that said each of said first plurality of said multiple packets is associated with a high real-time priority.

9. A data processing system for dynamically controlling end-to-end data flow over a network, wherein said data includes a plurality of packets to be transmitted, and wherein said data includes real-time and non-real-time data, said real-time data including a plurality of frames, each of said plurality of frames including multiple packets, comprising:

means for associating each of said plurality of packets with only one of a plurality of priority levels, said plurality of priority levels being established in a priority hierarchy;

means for initiating transmission of said plurality of packets from a transmitter to a receiver in said priority hierarchy;

means for storing said plurality of frames in a frame buffer included within said receiver;

means for during said transmission, monitoring a level of said plurality of frames stored within said frame buffer;

means responsive to said level of said plurality of frames crossing a first buffer threshold, for determining if a first plurality of said multiple packets are associated with a first priority level;

means responsive to said first plurality of said multiple packets being associated with a first priority level, for modifying said first priority level associated with each of said first plurality of said multiple packets, wherein each of said plurality of packets are associated with only a second priority level; and means for continuing transmission of said plurality of packets, wherein each of said first plurality of said multiple packets are transmitted utilizing said second priority level.

10. The system according to claim 9 further comprising:

means responsive to said level of said plurality of frames crossing a second buffer threshold, for determining if said first plurality of said multiple packets are associated with a second priority level;

means responsive to said first plurality of said multiple packets being associated with a second priority level, for modifying said first priority level associated with each of said first plurality of said multiple packets, wherein each of said plurality of packets are associated with only a first priority level; and means for continuing transmission of said plurality of packets, wherein each of said first plurality of said multiple packets are transmitted utilizing said first priority level.

11. The system according to claim 10 further comprising:

means for utilizing quality of service parameters to determine if said priority hierarchy should be altered; and means response to a determination that said priority hierarchy should be altered, for said receiver dynamically altering said priority hierarchy of said plurality of priority levels during said transmission, wherein said plurality of packets are transmitted in said altered priority hierarchy.

12. The system according to claim 9 wherein said means for establishing a priority hierarchy includes means for establishing a hierarchy including a control priority level, a high real-time priority level, a low real-time priority level, and then a non-real-time priority level.

13. The system according to claim 12 further comprising:

means for associating each of said plurality of packets including non-real-time data with a non-real-time priority level;

means for associated each of said plurality of packets including control data with a control priority level; and means for associating each of said plurality of packets including real-time data with one of a real-time priority levels, said real-time priority levels including a high real-time priority level and a low real-time priority level.

14. The system according to claim 13 wherein said means for monitoring further comprises means for determining if a level of said plurality of frames has changed.

15. The system according to claim 14 wherein said means for in response to said level of said plurality of frames crossing a first buffer threshold, determining if a first plurality of said multiple packets are associated with a first priority level, and means for in response to said first plurality of said multiple packets being associated with a first priority level, modifying said first priority level associated with each of said first plurality of said multiple packets, wherein each of said plurality of packets are associated with only a second priority level, further comprises:

means responsive to a determination that said level has changed, for determining if one of said plurality of frames has been added to said frame buffer;

means response to a determination that said one of said plurality of frames has been added to said frame buffer, for determining if said frame buffer is full;

means responsive to a determination that said frame buffer is not full, for determining if a first threshold has been crossed; and means responsive to said first threshold being crossed, for modifying said first priority level associated with each of said first plurality of said multiple packets so that said each of said first plurality of said multiple packets is associated with a low real-time priority.

16. The system according to claim 15 wherein said means for in response to said level of said plurality of frames crossing a second buffer threshold, determining if said first plurality of said multiple packets are associated with a second priority level, and mean for in response to said first plurality of said multiple packets being associated with a second priority level, modifying said first priority level associated with each of said first plurality of said multiple packets, wherein each of said plurality of packets are associated with only a first priority level, further comprises:

means responsive to a determination that said one of said plurality of frames has not been added to said frame buffer, for determining if said frame buffer is empty;

means response to a determination that said frame buffer is not empty, for determining if a second threshold has been crossed; and means response to said second threshold being crossed, for modifying said first priority level associated with each of said first plurality of said multiple packets so that said each of said first plurality of said multiple packets is associated with a high real-time priority.

* * * * *